United States Patent [19]

Chapsal et al.

[11] Patent Number: 4,680,686
[45] Date of Patent: Jul. 14, 1987

[54] ELECTRIC 3-PHASE SUPPLY DEVICE FOR AN OZONIZER

[75] Inventors: Paul Chapsal; Jean-Francois Petitimbert, both of Garges-les-Gonesse, France

[73] Assignee: Trailigaz "Cie Generale de l'Ozone", Garges-les-Gonesse, France

[21] Appl. No.: 812,682

[22] Filed: Dec. 23, 1985

[30] Foreign Application Priority Data

Dec. 28, 1984 [FR] France .................................. 84 20046

[51] Int. Cl.$^4$ .............................................. H02M 5/00
[52] U.S. Cl. ....................................... 363/10; 363/39; 363/64; 361/235; 204/176; 422/186.16
[58] Field of Search .......................... 363/3, 5, 9–12, 363/39, 64; 323/205–206, 208, 214–215, 218, 305, 308; 361/235; 204/176; 422/186.07, 186.15, 186.16

[56] References Cited

U.S. PATENT DOCUMENTS

| 2,748,338 | 5/1956 | Williamson . |
| 3,259,828 | 7/1966 | Biringer ................................ 363/12 |
| 3,800,210 | 3/1974 | Caussin ........................... 422/186.15 |
| 4,169,975 | 10/1979 | Block ............................... 323/345 X |
| 4,314,321 | 2/1982 | Galliker ................................ 363/10 |

Primary Examiner—Peter S. Wong
Attorney, Agent, or Firm—Sughrue, Mion, Zinn, Macpeak and Seas

[57] ABSTRACT

A supply device connected to a 3-phase mains supply for an ozonizer comprising at least two capacitive discharge elements (7, 8). The device comprises two single-phase step-up voltage transformers (1, 2) having air gaps (5, 6) connected in a Scott circuit and connected between the 3-phase mains supply and said discharge elements (7, 8).

5 Claims, 9 Drawing Figures

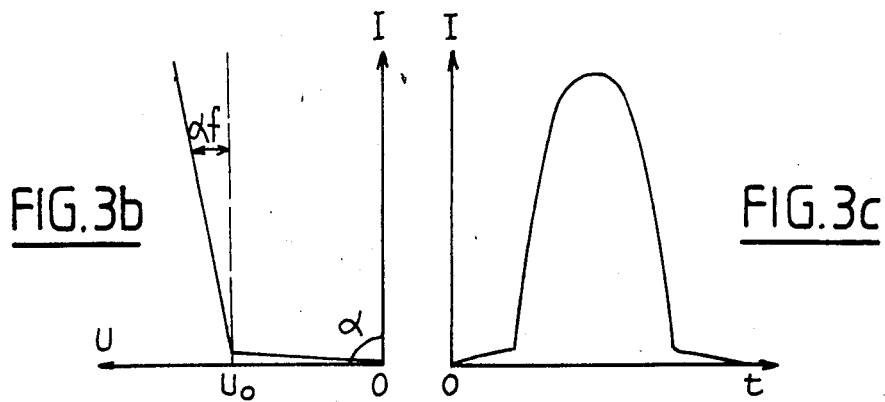
FIG. 3b
FIG. 3c
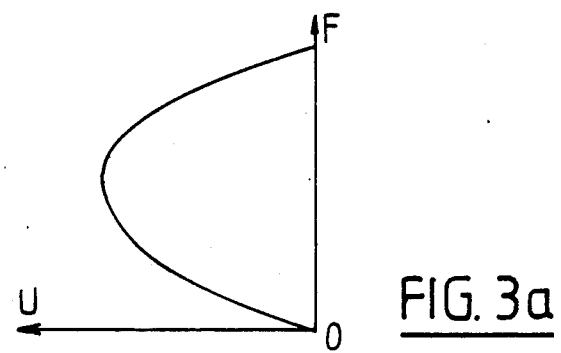
FIG. 3a
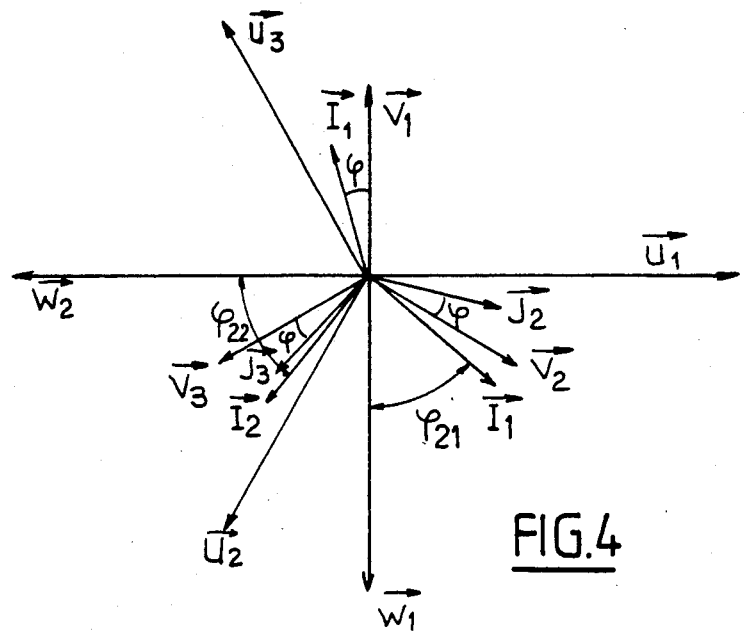
FIG. 4

ELECTRIC 3-PHASE SUPPLY DEVICE FOR AN OZONIZER

The present invention relates to ozone generating apparatus or ozonizers, and more particularly relates to electric supply devices for these apparatus.

Known ozonizers usually comprise a plurality of capacitive discharge elements each having two electrodes which are separated by a solid dielectric and a gaseous dielectric constituted by the gas in which the discharge must be produced.

The electric supply device of such an ozonizer comprises a single-phase transformer whose primary winding is supplied with alternating current from the mains supply and whose terminals of the secondary winding are respectively connected to said electrodes.

The ozone-producing discharge is produced by the application to the plates of the capacitive elements of an alternating voltage of a magnitude higher than a threshold voltage.

Upon each production of discharge, the electric resistance of the gaseous medium is cancelled out so that the circuit has a variation of impedance which is such that there is established, under the action of the sinusoidal voltage applied to the primary winding of the transformer, a state in which the current has a non-sinusoidal character comprising many harmonics of which certain, such as the third harmonic, may reach 80% of the amplitude of the fundamental term.

The establishment of a non-sinusoidal state has for consequence a decrease in the power factor of the ozonizer which decrease is the greater as the current is more deformed.

This deformation of the current state moreover has repercussions on the primary circuit of the transformer in the form of a large decrease in the power factor of the supply of this transformer.

In order to overcome this drawback, it has been proposed to employ a transformer having an air gap so as to produce a re-phasing of the current absorbed from the mains supply relative to the supply voltage.

However, such a re-phasing only concerns the fundamental term of the current so that the power factor of the primary winding of the transformer remains much lower than 1 and the overall efficiency of the installation remains low.

French Pat. No. 1 533 302 discloses an electric supply device for an ozone-producing apparatus comprising an air gap transformer whose primary winding is supplied with alternating current by the signal-phase mains supply and an inductance connected in series in the supply circuit of the primary winding of the transformer and adapted to produce by being added to the air gap inductance of the transformer the re-phasing of the third harmonic of the current and consequently an increase in the power factor of the primary winding of the transformer and of the ozonizer and an increase in the peak voltage applied to the ozonizer.

An arrangement of the aforementioned type is quite satisfactory with a single-phase supply.

However, this single-phase apparatus having a capacitive preponderance whose impedance characteristic is non linear has the following drawbacks.

(a) it may be difficult to use in a 3-phase mains supply without unbalancing it;

(b) as the supply current of the ozonizer is leading relative to the voltage, the power factor is bad;

(c) the appreciable harmonic ratio of the current applied to the ozonizer results in risks of disturbances in the mains supply.

The object of the invention is therefore to provide a supply device for an ozonizer which can be fed from the 3-phase mains supply and which is capable of operating under conditions of optimum efficiency.

The invention therefore provides a supply device for connection to the 3-phase mains supply for an ozonizer comprising at least two capacitive discharge elements, characterised in that it comprises two step-up single phase air gap transformers connected in a Scott circuit, inserted between the 3-phase mains supply and said discharge elements.

With such an arrangement, there is obtained a compensation of the capacitive currents of the discharge elements of the ozonizer by the magnetizing currents of the transformers of the Scott circuit due to the presence of air gaps of the magnetic circuits of these transformers.

According to a particular feature of the invention, the supply device further comprises a 3-phase inductance connected in series with each phase of the mains supply constituted by three coils mounted on a common magnetic circuit.

The presence of such an inductance permits the control of the harmonic ratio and the re-phasing and the balancing of the system.

A better understanding of the invention will be had from the following description which is given solely by way of example with reference to the accompanying drawings, in which:

FIGS. 3a to 3c show the curves of the deformations of the supply current of the magnetic field as a function of the variation in the impedance of the ozonizer;

FIG. 4 is a vector diagram of the voltages and currents of the supply device of FIG. 2;

Figure 1:
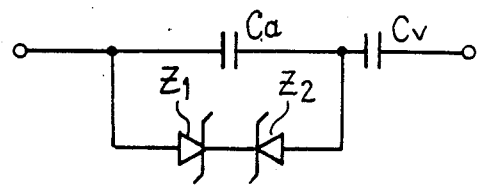
FIG. 1 is an equivalent diagram of an ozonizer.

The equivalent diagram of an ozonizer shown in FIG. 1 comprises two capacitors Ca and Cv connected in series, the capacitor Ca being shunted by two Zener diodes Z1, Z2 connected in opposition.

Figure 2:
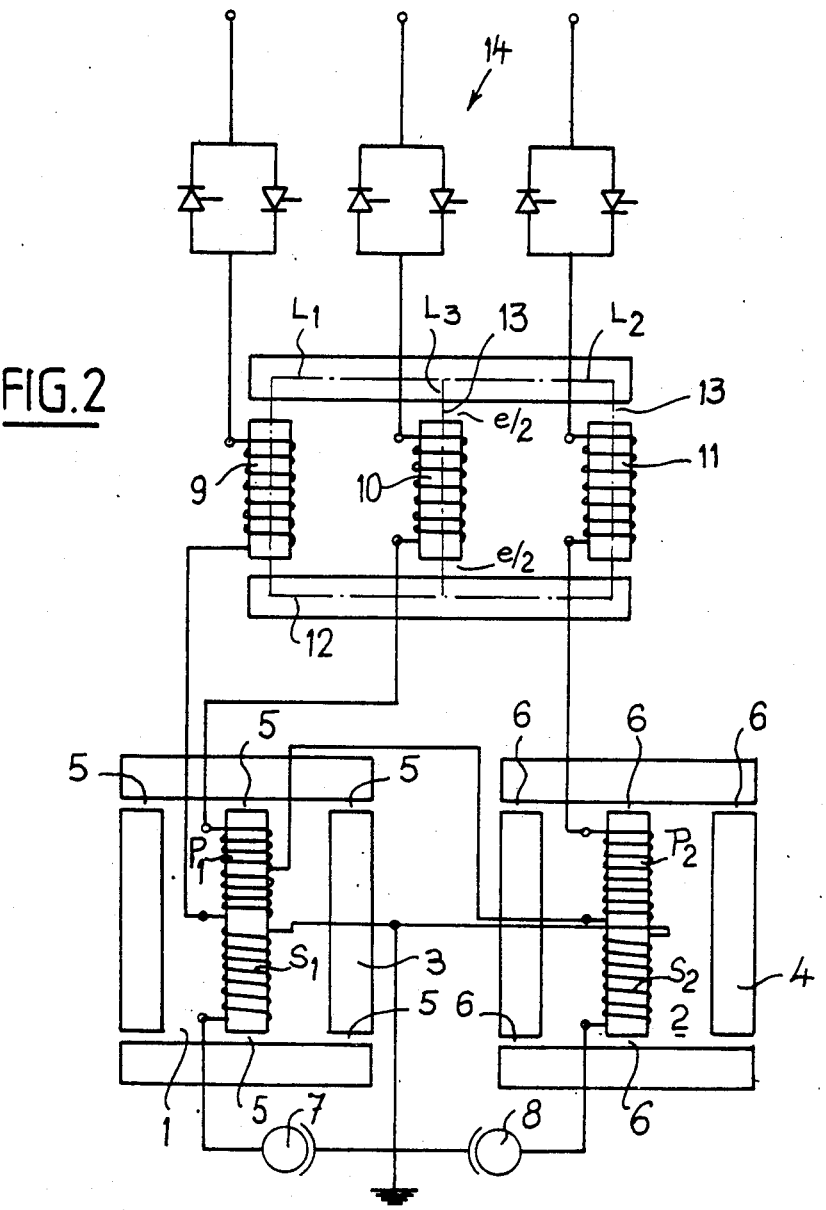
FIG. 2 is an electric diagram of the supply device of an ozonizer for connection to the 3-phase mains supply according to the invention.

The 3-phase supply device according to the invention is shown in FIG. 2.

This device mainly comprises two step-up single-phase voltage transformers 1 and 2 whose respective magnetic circuits 3 and 4 include air gaps 5, 6 between the various branches.

The transformers are connected to the 3-phase mains supply and to the discharge elements 7, 8 according to a Scott circuit.

The primary P1 of the transformer 1 is connected by its two terminals to two different phases of the mains supply and its mid-point is connected to a terminal of the primary P2 of the transformer 2. The other terminal of the primary P2 is connected to the third phase of the mains supply.

A winding 9, 10, 11 is connected in series in each of the phases of the mains supply. The three windings are carried by a common magnetic circuit 12 provided with air gaps 13 and thus form a 3-phase inductance.

The secondaries S1 and S2 of the transformers 1 and 2 are respectively connected to the terminals of the discharge elements 7 and 8 of the ozonizer.

The assembly thus formed is supplied with power by the 3-phase mains supply through a conventional wave chopping dimmer 14 consisting of only six thyristors arranged as three pairs of oppositely connected parallel thyristors, each pair being connected in series with a different phase of the 3-phase mains supply.

The primary P1 of the transformer 1 has twice $N1\sqrt{3}/2$ turns and its secondary S1 has N2 turns.

The primary 2 of the transformer P2 has N1 turns and its secondary S2 has N2 turns.

The operation of the device described above will be studied with reference to the graphs given in FIGS. 3a to 6.

In FIG. 3a, there is shown a semi-period of the supply voltage applied to a phase of the device.

The operation of an ozonizer tube gives an idealized current-voltage curve shown in FIG. 3b.

As the structure of an ozonizer is that shown in FIG. 1, its impedance before starting up is given by the equation:

$$Zi = Za + Zv = \tan = i \qquad (1)$$

After starting up, the impedance of the ozonizer is:

$$Zf = Zv = \tan \alpha f \qquad (2)$$

As the ozonizer is an RC circuit, the current is therefore leading with respect to the voltage.

In starting with the curve U=f(t) of FIG. 3a, there is determined the curve i=f(t) represented in FIG. 3c, without taking into account the harmonics.

The equations of the voltages of the transformers 1 and 2 are the following:

$$\vec{W1} = -\frac{2N2}{\sqrt{3}N1}\vec{U'} \qquad (3)$$

$$\vec{W2} = -\frac{N1}{N2}\vec{U1} \qquad (4)$$

in which W1 and W2 are the voltages at the terminals of the secondaries S1 and S2, U' and U1 are the voltages at the terminals of the primaries of these transformers.

The equations of the currents of these transformers are:

$$\vec{I1} = -\frac{2N2}{\sqrt{3}N1}\vec{I1} - j\frac{\vec{U'}}{L1\omega} \qquad (5)$$

$$\vec{I3} = \frac{N2}{N1}\left(\frac{1}{\sqrt{3}}\vec{I1} - \vec{I2}\right) + j\left(\frac{\vec{U'}}{2L1\omega} - \frac{\vec{U1}}{L2\omega}\right) \qquad (6)$$

$$\vec{I2} = \frac{N2}{N1}\left(\frac{1}{\sqrt{3}}\vec{I1} + \vec{I2}\right) + j\left(\frac{\vec{U'}}{2L1\omega} + \frac{\vec{U1}}{L2\omega}\right) \qquad (7)$$

in which L1 and L2 are the imaginary "primary" inductances creating the magnetizing current corresponding to the air gaps.

The circuit of FIG. 2 provides a compensation of the reactive power.

It concerns a compensation obtained by a "series" compensation permitting the compensation of a part of the reactive energy of the ozonizer and above all the stopping of the harmonic currents of the ozonizer and by a parallel compensation ensuring the compensation of the major part of the reactive energy.

Mixed compensation rate is the expression employed for the ratio between the "series" compensation and the total compensation (series+parallel) whose value corresponds to the capacitive reactive power of the tubes of the ozonizer.

The parallel compensation is in fact due to the air gaps 5 and 6 of the transformers 1 and 2.

The series compensation is obtained by the presence of the 3-phase inductance having air gaps.

Reference will be made again to FIG. 2 in order to continue the following explanation.

The reluctance R of each air gap is given by the equation:

$$R = e/\mu_o S \qquad (8)$$

The total reluctance of the circuit 3 is:

$$R_{T3} = \frac{1}{\mu_o 3}\left(e + \frac{l3}{\mu r}\right)$$

$\mu o$ and $\mu r$ are respectively the magnetic permeabilities of the air and of the material of the magnetic circuit.

The total reluctance of the circuits 1 and 2 is:

$$R_{T2} = R_{T1} = \frac{1}{\mu_o 3}\left(e + \frac{l}{\mu r}\right)$$

As can be seen, the air gap is preponderent since 1 and 13 are divided by $\mu r$.

Thus the following relation may be written:

$$RT1 \approx RT3 \approx RT2 \qquad (9)$$

The law $Ni = R\Phi$ permits finding a balancing of the current due to the same difference of electromagnetic potential:

The vector diagram of FIG. 4 illustrates the compensation of the current affforded by the device according to the invention.

In this diagram, the indicated values are the following:

| | |
|---|---|
| $\vec{W_1}, \vec{W_2}$ | Voltages at the secondaries S1, S2 of the transformers 1 and 2 of the Scott circuit. |
| $\vec{I_1}, \vec{I_2}$ | Secondary currents. |
| $\vec{V_1}, \vec{V_2}, \vec{V_3}$ | Simple voltages at the primaries P1, P2 |
| $\vec{U_1}, \vec{U_2}, \vec{U_3}$ | Composed voltages at the primaries. |
| $\vec{J_1}, \vec{J_2}, \vec{J_3}$ | Primary currents. |

Figure 5A:
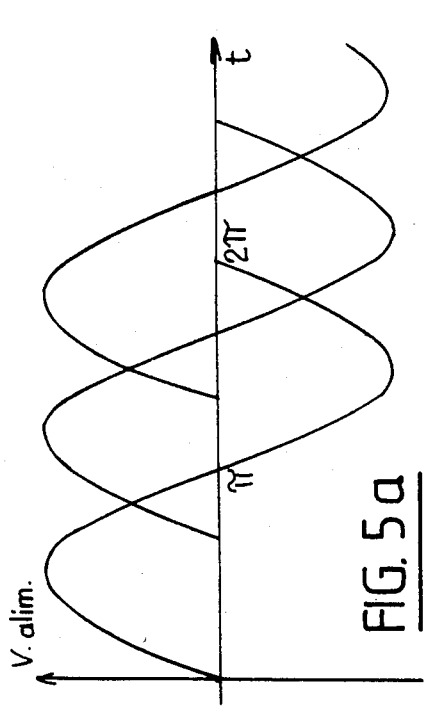
FIGS. 5a and 5b show respectively the supply voltages and the voltages on the faces of the ozonizer supplied with power by the device of FIG. 2.
Figure 5B:
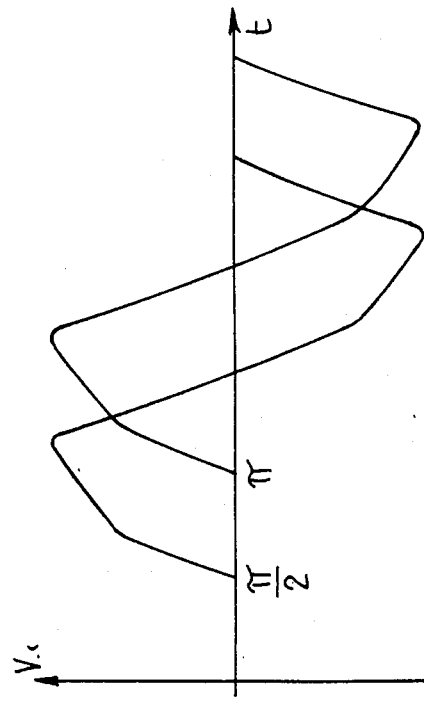

The diagrams of FIGS. 5a and 5b respectively show the wave forms of the 3-phase supply voltages of the device and of the 2-phase voltages applied to the faces of the ozonizer.

These 2-phase voltages have forms which show a distorsion relative to the sinusoidal forms of the supply voltages but which, owing to the compensation of the harmonic ratio and the dephasing obtained by means of the device of the invention, permits the obtainment for the ozonizer of an efficiency which is highly improved relative to that of known devices.

Figure 6:
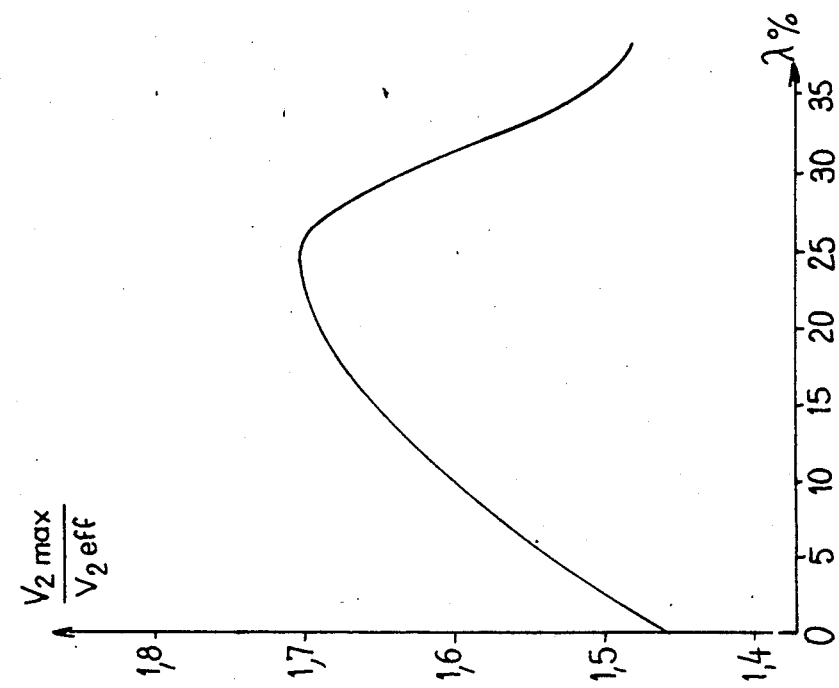
FIG. 6 is a diagram showing the results obtained with the device according to the invention.

FIG. 6 shows variations of the ratio U2max/U2eff as a function of $\lambda$ which is the mixed compensation rate.

The efficiency of the ozonizer is proportional to this ratio which is termed the peak factor.

For $\lambda=0$, the peak factor is lower than 1.5, it passes through a maximum in the neighbourhood of 1.7, For $\lambda=$ about 25% and remains higher than 1.6 up to $\lambda=$ about 30%.

This is obtained owing to the fact that, for each phase, the inductance in series 0, 10, 11 introduces a re-phasing of the third harmonic whereas the fundamental wave is put back into phase by the inductance of the air gap.

In the present embodiment, the coefficient $\lambda$ is advantageously between 25 and 30%.

The circuit just described affords in addition to the advantages of an improved efficiency owing to its connection to a 3-phase mains supply, the advantage of permitting the placing of the two parts of the Scott circuit in the vicinity of the discharge elements 7, 8 of the ozonizer which avoids the necessity of using high voltage energy conducting lines and results in a reduction in the cost and an improvement in the safety of the unit.

We claim:

1. A power supply device for connection to a 3-phase mains supply of an ozonizer comprising at least two capacitive discharge elements, said device comprising two single-phase step-up voltage transformers having air gaps connected in a Scott circuit, and connected between the 3-phase mains supply and said discharge elements.

2. A supply device according to claim 2, further comprising a 3-phase inductance in series with each phase of the mains supply constituted by three inductor windings mounted on a common magnetic circuit.

3. A supply device according to claim 2, wherein the magnetic circuit common to the three inductor windings is a magnetic circuit having air gaps, each of the inductor windings being connected in series with a different phase of the 3-phase mains supply, and the magnetic circuit containing an air gap in the magnetic flux path of each inductor winding.

4. A supply device according to claim 3, further comprising a wave-chopping dimmer consisting of only six thyristors arranged as three pairs of oppositely connected parallel thyristors, each pair being connected in series with a different phase of the 3-phase mains supply.

5. A supply device according to claim 3, wherein a first said voltage transformer has a primary winding P1 and a secondary winding S1, and the second said voltage transformer has a primary winding P2 and a secondary winding S2, winding P1 being connected in series with a first and a second said inductor winding and having its midpoint connected to one end of winding P2 which is connected in series with the third set inductor winding, windings S1 and S2 having N2 turns, winding P2 having N1 turns, and winding P1 having twice $N1\sqrt{3}/2$ turns.

* * * * *